UNITED STATES PATENT OFFICE.

FLORENTINE J. MACHALSKE, OF PLATTSBURG, NEW YORK, ASSIGNOR, BY MESNE ASSIGNMENTS, TO AMERICAN FERROLECTRIDE CORPORATION, OF PLATTSBURG, NEW YORK, A CORPORATION OF NEW YORK.

METHOD OF SMELTING ORES.

1,099,709.  Specification of Letters Patent.  Patented June 9, 1914.

No Drawing.  Application filed June 27, 1913. Serial No. 776,156.

*To all whom it may concern:*

Be it known that I, FLORENTINE J. MACHALSKE, a citizen of the United States, residing at Plattsburg, Clinton county, New York, have invented certain new and useful Improvements in Methods of Smelting Ores, of which the following is a full, clear, and exact description.

My invention relates to a new and improved method of smelting iron ores and has for its object to provide a method of smelting such ores so as to produce a metal which is largely free from impurities and carbon.

It is a known fact that all metallic oxids may be reduced to metallic form by means of ordinary carbon at a high temperature. Up to the present time, carbon has been used in different forms, as, for instance, wood charcoal, coal and coke as a reducing agent; but not in the form of graphite, especially artificially prepared graphite, which is the purest form of commercial graphite. I have discovered that the use of electrically prepared graphite as a reducing agent in metallurgical operations is a great advantage, because substantially no impurities are introduced by it into the charge and the amount of carbon which will be absorbed by the metal from the graphite is practically eliminated or reduced to a minimum. Moreover, the amount of current necessary is greatly reduced, due to the fact that the graphite is of higher conductivity than other forms of carbon.

In carrying out my method, I introduce into a suitable furnace a basic charge of ore, flux and artificial graphite, the flux being preferably calcium oxid in the form of burnt lime or of unburnt lime. In making the charge, I use substantially the same proportions of ore, carbon and lime as are now used in the ordinary process practised, substituting for the ordinary carbons now used a proportionate amount of graphite. The ferric oxid of the ore is reduced by being heated in the presence of the artificial graphite, the oxygen combining with the graphite to form carbon monoxid in the ordinary manner, but the artificial graphite, on account of its peculiar characteristics, does not combine with or attack the molten iron, with the result that the iron is not carburized by the reducing agent used in the charge.

In carrying out my process, I prefer to use a furnace having the portions of the lining which come into contact with the molten metal made of artificial graphite, as described in my application Ser. No. 776,158 filed simultaneously herewith, and to use electrodes composed of carbon rods surrounded by a filler of magnesium oxid (dolomite) as described in another application Ser. No. 776,157 filed by me simultaneously herewith, although any suitable furnace and electrodes may be used in carrying out my broad invention. What is known commercially as Acheson graphite, produced by treating ordinary carbon electrically, is a suitable artificial graphite for carrying out my process.

What I claim is:

1. An improvement in the process of smelting iron which consists in forming a basic charge composed of iron ore, graphite and a basic flux, and subjecting this charge to an electric current.

2. An improvement in the process of smelting iron which consists in forming a basic charge composed of iron ore, artificial graphite and a basic flux, and subjecting this charge to an electric current.

3. The process of smelting iron which consists in forming a basic charge of iron ore, artificial graphite and lime, and subjecting the same to an electric current.

4. An improvement in the process of smelting iron which consists in forming a basic charge composed of iron ore, graphite and a basic flux, and subjecting this charge to an electric current in a furnace lined with graphite.

FLORENTINE J. MACHALSKE.

Witnesses:
 W. H. CLARK,
 T. G. HOYT.

Copies of this patent may be obtained for five cents each, by addressing the "Commissioner of Patents, Washington, D. C."